United States Patent
Li

(10) Patent No.: US 12,106,004 B2
(45) Date of Patent: Oct. 1, 2024

(54) SCREEN DISPLAY METHOD AND APPARATUS, ELECTRONIC DEVICE, AND COMPUTER STORAGE MEDIUM

(71) Applicant: HUAWEI TECHNOLOGIES CO., LTD., Guangdong (CN)

(72) Inventor: Xue Li, Wuhan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 18/006,002

(22) PCT Filed: Jul. 23, 2021

(86) PCT No.: PCT/CN2021/108068
§ 371 (c)(1),
(2) Date: Jan. 19, 2023

(87) PCT Pub. No.: WO2022/022405
PCT Pub. Date: Feb. 3, 2022

(65) Prior Publication Data
US 2023/0297309 A1    Sep. 21, 2023

(30) Foreign Application Priority Data

Jul. 31, 2020    (CN) .......................... 202010763015.9

(51) Int. Cl.
*G06F 3/14*    (2006.01)
(52) U.S. Cl.
CPC ................................ *G06F 3/1423* (2013.01)

(58) Field of Classification Search
None
See application file for complete search history.

(56) References Cited

U.S. PATENT DOCUMENTS

| | | | |
|---|---|---|---|
| 2018/0011676 | A1 | 1/2018 | Han et al. |
| 2019/0129596 | A1 | 5/2019 | Ligameri et al. |
| 2021/0160355 | A1* | 5/2021 | Min ...................... G06F 1/1683 |

(Continued)

FOREIGN PATENT DOCUMENTS

| | | |
|---|---|---|
| CN | 102510456 A | 6/2012 |
| CN | 103686415 A | 3/2014 |
| CN | 104238977 A | 12/2014 |

(Continued)

*Primary Examiner* — Joseph R Haley
(74) *Attorney, Agent, or Firm* — HUAWEI TECHNOLOGIES CO., LTD.

(57) ABSTRACT

A screen display method is provided to control each display to display corresponding display data when at least two displays exist. The method includes: receiving a multi-screen display instruction, where the multi-screen display instruction instructs the at least two displays to separately display corresponding pictures; obtaining a picture to be displayed on a first display; converting the first picture into sent-for-display data to be sent to the first display; sending the sent-for-display data of the first display to the first display, to enable the first display to display the first picture; obtaining a picture to be displayed on a second display; converting the second picture into sent-for-display data to be sent to the second display; and sending the sent-for-display data of the second display to the second display, to enable the second display to display the second picture.

14 Claims, 11 Drawing Sheets

(56) References Cited

U.S. PATENT DOCUMENTS

2022/0246085 A1\* 8/2022 Otsuka .................. G09G 5/006

FOREIGN PATENT DOCUMENTS

| | | | |
|----|----------|---|---------|
| CN | 104793912 | A | 7/2015 |
| CN | 105743949 | A | 7/2016 |
| CN | 107526565 | A | 12/2017 |
| CN | 108234875 | A | 6/2018 |
| CN | 108496366 | A | 9/2018 |
| CN | 109300442 | A | 2/2019 |
| CN | 108174027 | B | 5/2021 |
| JP | H1062865 | A | 3/1998 |

\* cited by examiner

SCREEN DISPLAY METHOD AND APPARATUS, ELECTRONIC DEVICE, AND COMPUTER STORAGE MEDIUM

CROSS-REFERENCE TO RELATED APPLICATIONS

This application is a National Stage of International Application No. PCT/CN2021/108068, filed on Jul. 23, 2021, which claims priority to Chinese Patent Application No. 202010763015.9, filed on Jul. 31, 2020, both of which are hereby incorporated by reference in their entireties.

TECHNICAL FIELD

This application relates to the field of display technologies, and in particular, to a screen display method and apparatus, an electronic device, and a computer storage medium.

BACKGROUND

With development of display manufacturing technologies, a screen of an electronic device is gradually developing from a single screen to two screens or even a plurality of screens. For an electronic device having at least two screens, an increase in a quantity of displays imposes a higher requirement on software control of each display by a processor chip.

SUMMARY

Embodiments of this application provide a screen display method and apparatus, an electronic device, and a computer storage medium, to control each display to display corresponding display data when at least two displays exist.

To achieve the foregoing objective, this application uses the following technical solutions.

According to a first aspect, an embodiment of this application provides a screen display method, including: receiving a multi-screen display instruction, where the multi-screen display instruction instructs at least two displays to separately display corresponding pictures: obtaining a picture to be displayed on a first display, to obtain a first picture: converting the first picture into sent-for-display data to be sent to the first display: sending the sent-for-display data of the first display to the first display, to enable the first display to display the first picture: after the sending the sent-for-display data of the first display to the first display, obtaining a picture to be displayed on a second display, to obtain a second picture: converting the second picture into sent-for-display data to be sent to the second display: and sending the sent-for-display data of the second display to the second display, to enable the second display to display the second picture.

The screen display method provided in this embodiment of this application may be applied to an electronic device provided with at least two displays. For example, the method provided in this application is performed by the foregoing electronic device. When a user performs a specified preset operation on the electronic device, for example, the user taps an icon, makes a sound instruction, or taps the display twice by using a knuckle (including but not limited to the foregoing examples), and when the electronic device receives the specified operation, the electronic device determines that the multi-screen display instruction is received, and separately displays corresponding pictures on the at least two displays. Optionally, a picture displayed on each display may be indicated by the foregoing preset operation, for example, first tapping of the first display and the second display indicates that content displayed on the first display is synchronously displayed on the second display.

For example, the multi-screen display instruction instructs to display corresponding pictures on at least the first display and the second display. After the multi-screen display instruction is received, processing is alternately performed on each display: The picture of the first display may be first processed and sent for display: After the first picture to be displayed on the first display is obtained, the first picture is converted into a first group of data that can be identified by the first display, and the first group of data is sent to the first display. After the sent-for-display data of the first display is processed and sent, the picture of the second display is processed and sent for display: After the second picture to be displayed on the second display is obtained, the second picture is converted into a second group of data that can be identified by the second display, and the second group of data is sent to the second display. After the sent-for-display data of the second display is processed and sent, data of the first display is processed again and sent for display. This process repeats. If there is still a third display, a cycle may be performed in a sequence of the first display→the second display→the third display. Optionally, another sequence may be used for arrangement. In a cycle, some displays may be processed for a plurality of times. For example, a sequence of a cycle is the first display→the third display-→the third display→the second display. This is not specifically limited in this embodiment of this application.

According to the method provided in this embodiment of this application, a generation process and a sent-for-display process of a next group of sent-for-display data are performed only after a generation process and a sent-for-display process of a group of sent-for-display data are completed. Because the sent-for-display process also takes a specific period of time, after the group of sent-for-display data is sent for display, a picture is obtained to generate sent-for-display data, and a case can be avoided in which sent-for-display data is stacked in a buffer because a picture corresponding to the sent-for-display data generated by a processor is not in real time or the sent-for-display data generated by the processor cannot be sent out in time, and data processing pressure of the processor can be reduced. This may be applied to an application scenario in which the processor of the electronic device has only one display interface to output sent-for-display data to each display.

In a possible implementation, before the sending the sent-for-display data of the first display to the first display, the method further includes: sending a first control signal to a switching module, where the first control signal is used to control the switching module to establish a first communication connection to the first display, and the first communication connection is used to transmit the sent-for-display data of the first display. Before the sending the sent-for-display data of the second display to the second display, the method further includes: sending a second control signal to the switching module, where the second control signal is used to control the switching module to establish a second communication connection to the second display, and the second communication connection is used to transmit the sent-for-display data of the second display.

In a possible implementation, the converting the first picture into sent-for-display data to be sent to the first display includes: generating, based on a screen configuration parameter of the first display, the sent-for-display data corresponding to the first picture. The converting the second picture into sent-for-display data to be sent to the second display includes: generating, based on a screen configuration parameter of the second display, the sent-for-display data corresponding to the second picture.

In a possible implementation, the sending the sent-for-display data of the first display to the first display includes: sending the sent-for-display data of the first display according to a communication protocol of the first communication connection. The sending the sent-for-display data of the second display to the second display includes: sending the sent-for-display data of the second display according to a communication protocol of the second communication connection.

In a possible implementation, the communication protocol of the first communication connection and the communication protocol of the second communication connection are a display serial interface DSI protocol in a mobile industry processor interface MIPI protocol.

In a possible implementation, the receiving a multi-screen display instruction includes: receiving a first operation used to indicate to display a first camera function page on the first display: displaying the first camera function page on the first display in response to the first operation: receiving, on the first camera function page, a second operation used to indicate to display a second camera function page on the second display: and displaying the second camera function page on the second display in response to the second operation.

In a possible implementation, the obtaining a picture to be displayed on a first display includes: obtaining a first framed image captured by a camera lens: and generating the first camera function page based on the first framed picture. The obtaining a picture to be displayed on a second display includes: obtaining a second framed image captured by the camera lens: and generating the second camera function page based on the second framed picture.

In a possible implementation, after the first display displays the first picture, the first display switches a displayed picture when receiving next sent-for-display data. After the second display displays the second picture, the second display switches a displayed picture when receiving a next group of sent-for-display data.

According to a second aspect, an embodiment of this application further provides a screen display apparatus. The apparatus is configured to perform the screen display method according to any implementation of the first aspect.

According to a third aspect, an embodiment of this application provides an electronic device, including at least two displays, one or more processors, one or more memories, a communications module, and one or more computer programs. The one or more computer programs are stored in the one or more memories. The one or more computer programs include instructions. When the instructions are executed by the electronic device, the electronic device is enabled to perform the following steps: receiving a multi-screen display instruction, where the multi-screen display instruction instructs the at least two displays to separately display corresponding pictures: obtaining a picture to be displayed on a first display; to obtain a first picture; converting the first picture into sent-for-display data to be sent to the first display: sending the sent-for-display data of the first display to the first display, to enable the first display to display the first picture: after sending a first group of data to the first display, obtaining a picture to be displayed on a second display, to obtain a second picture: converting the second picture into sent-for-display data to be sent to the second display: and sending the sent-for-display data of the second display to the second display, to enable the second display to display the second picture.

In a possible implementation, when the instructions are executed by the electronic device, the electronic device is enabled to perform, before the sending the sent-for-display data of the first display to the first display, the following step: sending a first control signal to a switching module, where the first control signal is used to control the switching module to establish a first communication connection to the first display, and the first communication connection is used to transmit the sent-for-display data of the first display. When the instructions are executed by the electronic device, the electronic device is enabled to perform, before the sending the sent-for-display data of the second display to the second display, the following step: sending a second control signal to the switching module, where the second control signal is used to control the switching module to establish a second communication connection to the second display, and the second communication connection is used to transmit the sent-for-display data of the second display.

In a possible implementation, when the instructions are executed by the electronic device, the electronic device is enabled to perform, when performing the converting the first picture into sent-for-display data to be sent to the first display, the following step: generating, based on a screen configuration parameter of the first display, the sent-for-display data corresponding to the first picture. When the instructions are executed by the electronic device, the electronic device is enabled to perform, when performing the converting the second picture into sent-for-display data to be sent to the second display, the following step: generating, based on a screen configuration parameter of the second display, the sent-for-display data corresponding to the second picture.

In a possible implementation, when the instructions are executed by the electronic device, the electronic device is enabled to perform, when performing the sending the sent-for-display data of the first display to the first display, the following step: sending the sent-for-display data of the first display according to a communication protocol of the first communication connection. When the instructions are executed by the electronic device, the electronic device is enabled to perform, when performing the sending the sent-for-display data of the second display to the second display; the following step: sending the sent-for-display data of the second display according to a communication protocol of the second communication connection.

In a possible implementation, the communication protocol of the first communication connection and the communication protocol of the second communication connection are a display serial interface DSI protocol in a mobile industry processor interface MIPI protocol.

In a possible implementation, when the instructions are executed by the electronic device, the electronic device is enabled to perform, when performing the receiving a multi-screen display instruction, the following steps: receiving a first operation used to indicate to display a first camera function page on the first display: displaying the first camera function page on the first display in response to the first operation: receiving, on the first camera function page, a second operation used to indicate to display a second camera function page on the second display: and displaying a second camera function page on the second display in response to the second operation.

In a possible implementation, when the instructions are executed by the electronic device, the electronic device is enabled to perform, when performing the obtaining a picture to be displayed on a first display, the following steps: obtaining a first framed picture captured by a camera lens: and generating the first camera function page based on the first framed picture. When the instructions are executed by the electronic device, the electronic device is enabled to perform, when performing the obtaining a picture to be displayed on a second display, the following steps: obtaining a second framed picture captured by the camera lens: and generating the second camera function page based on the second framed picture.

In a possible implementation, when the instructions are executed by the electronic device, the electronic device is enabled to perform the following: after the first display displays the first picture, the first display switches a displayed picture when receiving next sent-for-display data: and after the second display displays the second picture, the second display switches a displayed picture when receiving a next group of sent-for-display data.

According to a fourth aspect, an embodiment of this application provides a computer storage medium, including computer instructions. When the computer instructions are run on a terminal, the terminal is enabled to perform the method according to any implementation of the first aspect.

According to a fifth aspect, an embodiment of this application provides a computer program product. When the computer program product runs on a terminal, the terminal is enabled to perform the method according to any implementation of the first aspect.

It may be understood that the terminal, the computer storage medium, and the computer program product provided above are all configured to perform the corresponding method provided above. Therefore, for beneficial effects that can be achieved by the terminal, the computer storage medium, and the computer program product, refer to the beneficial effects in the corresponding method provided above. Details are not described herein again.

DESCRIPTION OF EMBODIMENTS

The following describes implementations of embodiments in detail with reference to the accompanying drawings.

Figure 1:
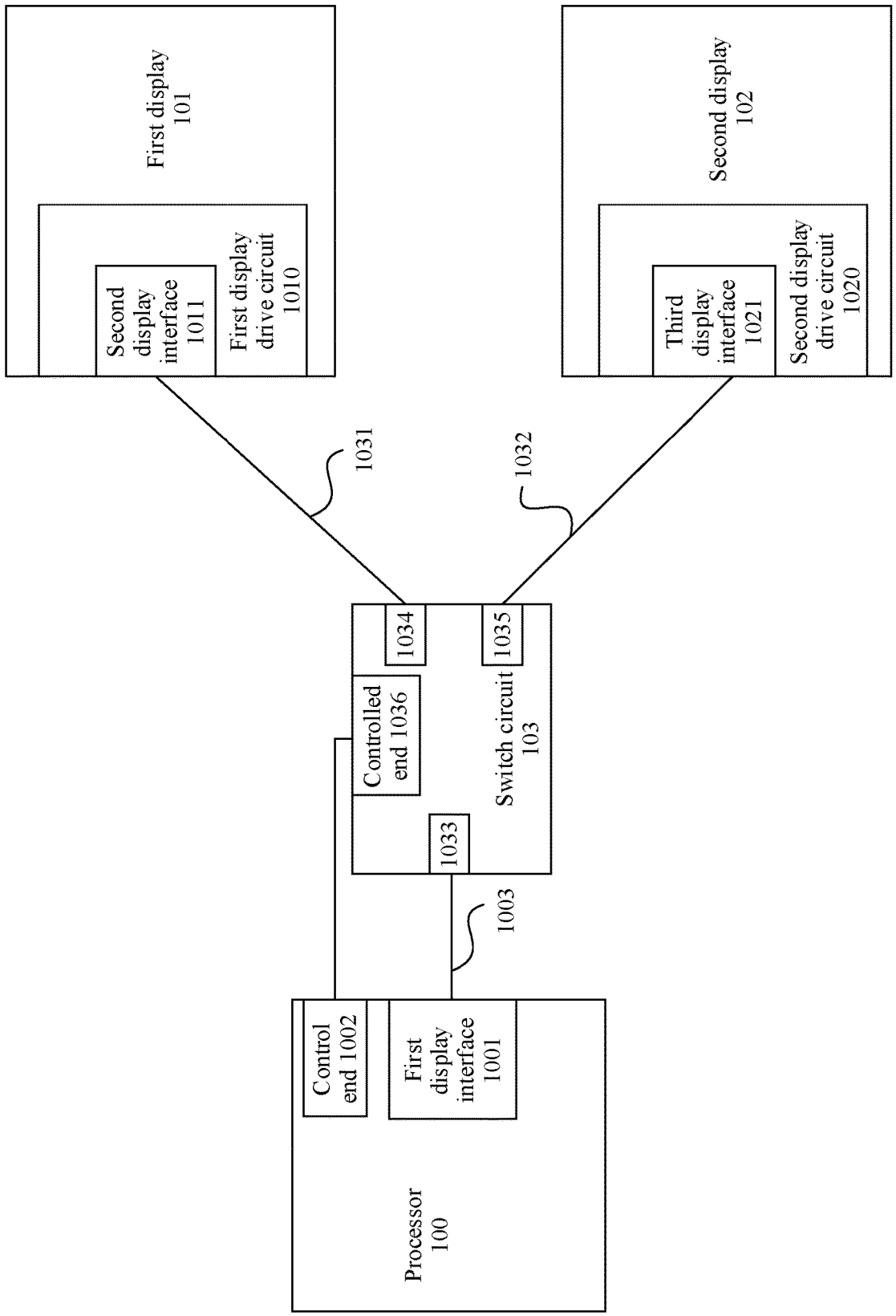
FIG. 1 is a schematic diagram 1 of a structure of an electronic device according to an embodiment of this application.

A screen display method provided in embodiments of this application may be applied to an electronic device. The electronic device may be a device such as a mobile terminal (such as a mobile phone or a tablet computer), a smart screen, an uncrewed aerial vehicle, an intelligent connected vehicle (Intelligent Connected Vehicle, ICV for short), an intelligent vehicle (smart/intelligent car), or a vehicle-mounted device. FIG. 1 is a block diagram of a hardware structure of an optional electronic device.

As shown in FIG. 1, the electronic device includes a first display 101, a second display 102, a processor 100, and a switch circuit 103.

The processor 100 may include one or more processing units. For example, the processor 100 may include one or more of a plurality of processing units, such as a central processing unit (Central Processing Unit, CPU for short), an application processor (application processor, AP for short), a modem processor, a graphics processing unit (graphics processing unit, GPU for short), an image signal processor (image signal processor, ISP for short), a controller, a video codec, a digital signal processor (digital signal processor, DSP for short), a baseband processor, a neural-network processing unit (neural-network processing unit, NPU for short), and/or the like. Different processing units may be independent hardware components, or may be integrated into a same hardware component or different hardware components.

A memory may be further disposed in the processor 100, and is configured to store instructions and data. In some embodiments, the memory in the processor 100 may be a cache. The memory may store instructions or data just used or cyclically used by the processor 100. If the processor 100 needs to use the instructions or the data again, the processor 100 may directly invoke the instructions or the data from the memory. This avoids repeated access, reduces waiting time of the processor 100, and improves system efficiency.

In addition to the memory disposed in the processor 100, the electronic device may further include another memory (referred to as an internal memory below), to store one or more computer programs. The one or more computer programs include instructions. The processor 100 may run the instructions stored in the internal memory, so that the electronic device performs the screen display methods provided in some embodiments of this application, various function applications, data processing, and the like. The internal memory may include a program storage area and a data storage area. The program storage area may store an operating system. The program storage area may further store one or more applications (for example, Gallery and Contacts), and the like. The data storage area may store data (for example, a photo and a contact) created during use of the electronic device. In addition, the internal memory may further include a high-speed random access memory, a nonvolatile memory, and the like, for example, one or more magnetic disk storage devices, a flash storage device, or a universal flash storage (universal flash storage, UFS for short). In some other embodiments, the processor 100 runs the instructions stored in the internal memory and/or the instructions stored in the memory disposed in the processor, so that the electronic device performs the methods provided in embodiments of this application, various function applications, and data processing.

The processor 100 may further include one or more interfaces. As shown in FIG. 1, the processor 100 includes at least a first display interface 1001. The first display interface 1001 is configured to output display data, so that a display that receives the display data displays picture content carried in the display data. Optionally, the first display interface 1001 may be a mobile industry processor interface (mobile industry processor interface, MIPI for short) protocol-based display serial interface (display serial interface, DSI for short) transmitter (transport, TX for short). The interface configured for the processor 100 may further include an inter-integrated circuit (inter-integrated circuit, I2C for short) interface, an inter-integrated circuit sound (inter-integrated circuit sound, I2S for short) interface, a pulse code modulation (pulse code modulation, PCM for short) interface, a universal asynchronous receiver/transmitter (universal asynchronous receiver/transmitter, UART for short) interface, a general-purpose input/output (general-purpose input/output, GPIO for short) interface, a subscriber identity module (subscriber identity module, SIM for short) interface, a universal serial bus (universal serial bus, USB for short) interface, and/or the like.

The switch circuit 103 may be of a hardware circuit structure, and may be implemented in a form of an integrated circuit. The switch circuit 103 may be printed in a hardware component in the electronic device. For example, the switch circuit 103 and the processor 100 may be disposed in a same chip, for example, a System-on-a-Chip system chip (SOC chip for short), or the switch circuit 103 may be disposed in a chip other than a chip in which the processor 100 is located, or the switch circuit 103 may be used as an independent hardware component and disposed independently.

The switch circuit 103 may be controlled by a control signal received by a controlled end 1036, to select one communication connection from a communication connection 1031 between the switch circuit 103 and a second display interface 1010 and a communication connection 1032 between the switch circuit 103 and a third display interface 1020 to establish a communication connection 1003 between the first display interface 1001 and the switch circuit 103. For example, if the control signal received by the controlled end 1036 is at a high level, the switch circuit 103 connects the first display interface 1001 to the second display interface 1010, and disconnects the first display interface 1001 from the third display interface 1020. If the control signal is at a low level, the switch circuit 103 disconnects the first display interface 1001 from the second display interface 1010, and connects the first display interface 1001 to the third display interface 1020. The control signal received by the controlled end 1036 may be sent by using a control end 1002 of the processor 100. In some optional implementations, the control end 1002 may be integrated into any interface of the processor 100.

The first display 101 and the second display 102 may be configured to display an image, a video, and the like. The first display 101 and the second display 102 may include display panels. The display panel may use a liquid crystal display (liquid crystal display, LCD for short), an organic light-emitting diode (organic light-emitting diode, OLED for short), an active-matrix organic light-emitting diode (active-matrix organic light-emitting diode, AMOLED for short), a flexible light-emitting diode (flexible light-emitting diode, FLED for short), a mini LED, a micro LED, a micro OLED, a quantum dot light-emitting diode (quantum dot light-emitting diode, QLED for short), or the like.

In addition, the first display 101 and the second display 102 each further include a corresponding display drive circuit: a first display drive circuit 1010 and a second display drive circuit 1020. Optionally, the display drive circuit may be used as an independent hardware chip, for example, a display driver integrated circuit (display driver integrated circuit, DDIC for short). Each display drive circuit is further provided with corresponding display interfaces: a second display interface 1011 and a third display interface 1021. Each display drive circuit may convert, according to a control requirement of a corresponding display panel, a signal received by a correspondingly configured display interface into a control signal used to control a light emitting status of an electronic component on the display panel. When the first display interface 1001 is the MIPI protocol-based DSI transmitter, the second display interface 1011 and the third display interface 1021 may be MIPI protocol-based DSI receivers (receive, RX for short).

Figure 2A:
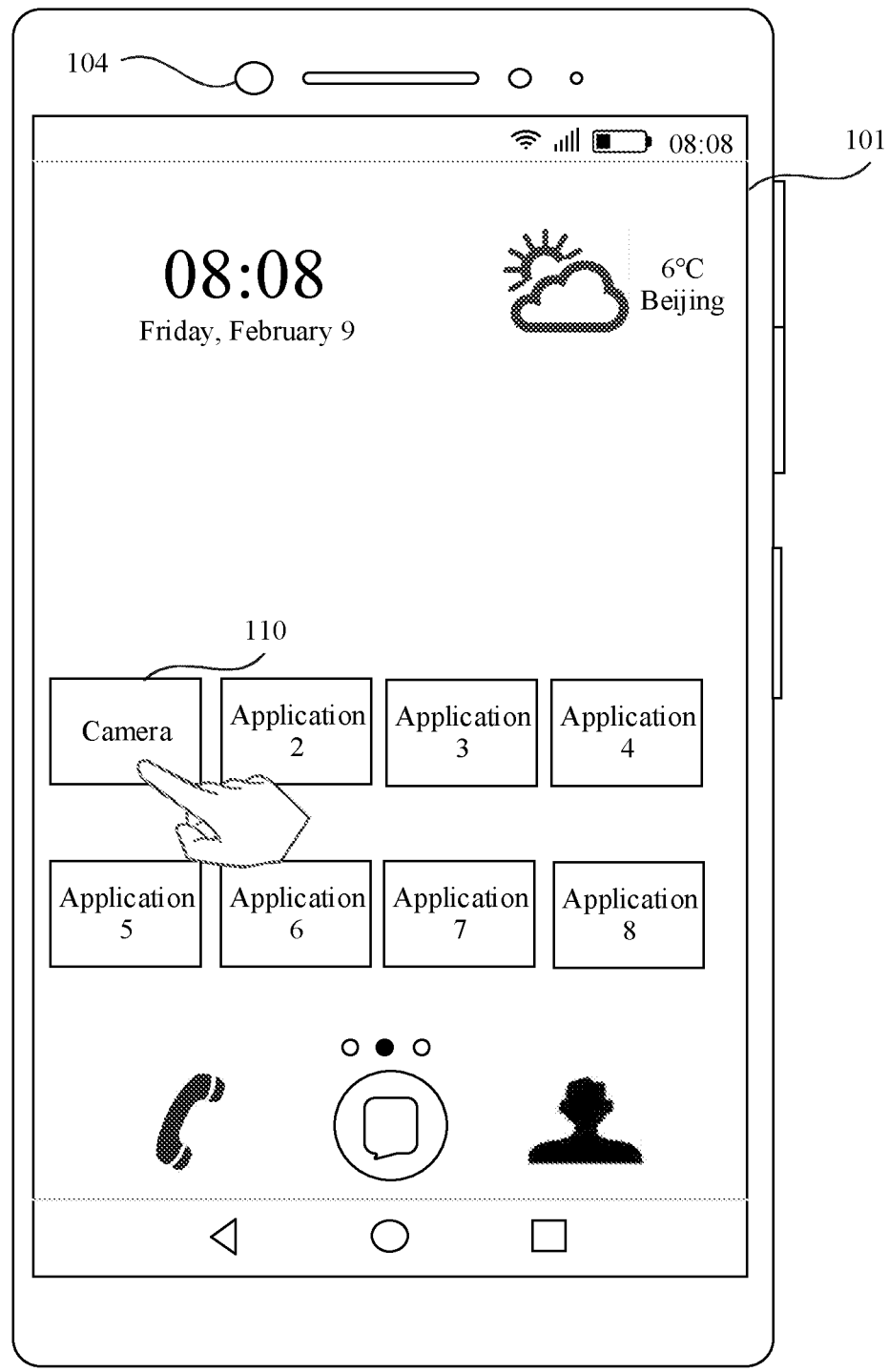
FIG. 2a is a schematic interaction diagram 1 of a screen display method according to an embodiment of this application.
Figure 2B:
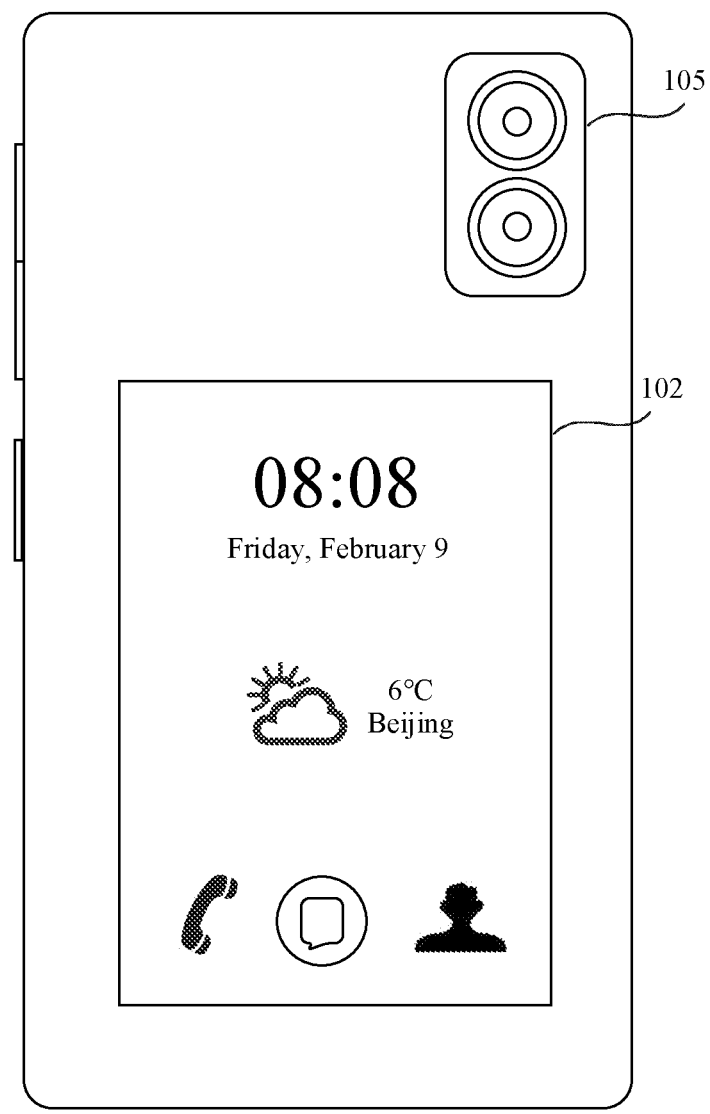
FIG. 2b is a schematic interaction diagram 2 of a screen display method according to an embodiment of this application.

For example, the electronic device may be specifically a mobile phone. FIG. 2a and FIG. 2b are a schematic diagram of a front view of an electronic device and a schematic diagram of a rear view of the electronic device, respectively. As shown in FIG. 2a, a front side of a mobile phone includes a display: a first display 101, and a back side of the mobile phone includes a display; a second display 102. The first display 101 may be a display in a touchscreen. The touchscreen is further configured with a touch sensor, to sense a touch of a medium (such as a finger or a stylus) and generate a corresponding electrical signal, to determine information such as a touch location and touch time. Optionally, the second display 102 may also be a display in a touchscreen. In other words, in an optional example, touchscreens may be configured on both the front side and the back side of the mobile phone. In some other examples, more displays may be further included. Details are not described herein in this embodiment of this application.

As shown in FIG. 2a and FIG. 2b, the mobile phone provided in this example may further include a camera 104 and a camera 105. The camera 105 includes one or more camera lenses, and each camera lens is configured to capture an image. The mobile phone may implement an image or video shooting function by using an ISP, a video codec, a GPU, an application processor, and the like.

The ISP is configured to process data fed back by the camera lens. For example, during photographing, a shutter is pressed, and light is transmitted to a photosensitive element of the camera lens through the camera lens. The photosensitive element converts an optical signal into an electrical signal, and the photosensitive element of the camera lens transmits the electrical signal to the ISP for processing, to convert the electrical signal into image data. The ISP may further perform algorithm optimization on noise, brightness, and complexion of the image. The ISP may further optimize parameters such as exposure and a color temperature of a photographing scenario. In some embodiments, the ISP may be disposed in the camera lens. The video codec is configured to compress or decompress a digital video. The mobile phone may support one or more video codecs. In this way, the mobile phone can play or record videos in a plurality of coding formats, for example, moving picture experts group (moving picture experts group, MPEG)-1, MPEG-2, MPEG-3, and MPEG-4.

The mobile phone may implement a display function by using the GPU processing unit in a processor 100, the first display 101, the second display 102, the application processor, and the like. The GPU is a microprocessor for image processing, and is configured to perform mathematical and geometric computation and image rendering. The processor 100 may include one or more GPUs that execute program instructions to generate or change display content.

The mobile phone may further include a communications module, and the communications module may include a mobile communications module and/or a wireless communications module, to implement a wireless communication function of the mobile phone. The wireless communication function of the mobile phone may be implemented through an antenna, the mobile communications module and/or the wireless communications module, a modem processor, a baseband processor, and the like. The antenna is configured to transmit and receive an electromagnetic wave signal. Each antenna in the mobile phone may be configured to cover one or more communication frequency bands. Different antennas may be further multiplexed, to improve antenna utilization. For example, one antenna can be multiplexed as a diversity antenna of a wireless local area network. In some other embodiments, the antenna may be used in combination with a tuning switch.

In some embodiments, the antenna of the mobile phone may include a first antenna and a second antenna. The first antenna of the mobile phone is coupled to the mobile communications module, and the second antenna is coupled to the wireless communications module, so that the mobile phone can communicate with a network and another device by using a wireless communications technology.

The mobile communications module may provide a solution that is applied to the mobile phone and that includes wireless communication such as 2G/3G/4G/5G. The mobile communications module may include one or more filters, a switch, a power amplifier, a low noise amplifier (low noise amplifier, LNA for short), and the like. The mobile communications module may receive an electromagnetic wave through the first antenna, perform processing such as filtering and amplification on the received electromagnetic wave, and transmit a processed electromagnetic wave to the modem processor for demodulation. The mobile communications module may further amplify a signal modulated by the modem processor, and convert an amplified signal into an electromagnetic wave for radiation through the first antenna. In some embodiments, at least some function modules of the mobile communications module may be disposed in the processor 100. In some embodiments, at least some function modules of the mobile communications module may be disposed in a same device as at least some modules of the processor 100.

The wireless communications module may provide a wireless communication solution that is applied to the mobile phone, and that includes a wireless local area network (wireless local area network, WLAN for short) (for example, a wireless fidelity (wireless fidelity, Wi-Fi for short) network), Bluetooth (Bluetooth, BT for short), a global navigation satellite system (global navigation satellite system, GNSS for short), frequency modulation (frequency modulation, FM for short), a near field communication (near field communication, NFC for short) technology, an infrared (infrared, IR for short) technology, and the like. The wireless communications module may be one or more components integrated with one or more communications processing modules. The wireless communications module receives an electromagnetic wave through the second antenna, performs frequency modulation and filtering processing on an electromagnetic wave signal, and sends a processed signal to the processor 100. The wireless communications module may further receive a to-be-sent signal from the processor 100, perform frequency modulation and amplification on the signal, and convert a processed signal into an electromagnetic wave for radiation through the second antenna.

The wireless communications technology may include a global system for mobile communications (global system for mobile communications, GSM for short), a general packet radio service (general packet radio service, GPRS for short), code division multiple access (code division multiple access, CDMA for short), wideband code division multiple access (wideband code division multiple access, WCDMA for short), time-division code division multiple access (time-division code division multiple access, TD-SCDMA for short), long term evolution (long term evolution, LTE for short), BT, a GNSS, a WLAN, NFC, FM, an IR technology, and/or the like. The GNSS may include a global positioning system (global positioning system, GPS for short), a global navigation satellite system (global navigation satellite system, GLONASS for short), a BeiDou navigation satellite system (BeiDou navigation satellite system, BDS for short), a quasi-zenith satellite system (quasi-zenith satellite system, QZSS for short), and/or a satellite based augmentation system (satellite based augmentation system, SBAS for short).

The mobile phone may implement audio functions such as music playing and recording through an audio module, a speaker, a receiver, a microphone, a headset jack, the application processor, and the like.

It may be understood that structures shown in FIG. 1, FIG. 2a, and FIG. 2b in embodiments of this application do not constitute a specific limitation to the electronic device provided in this application. In some other embodiments of this application, the electronic device may include more or fewer components than those shown in FIG. 1, FIG. 2a, and FIG. 2b, or combine some components, or split some components, or have a different component arrangement. The components shown in the figures may be implemented by hardware, software, or a combination of software and hardware.

The following describes in detail a screen display method according to an embodiment of this application with reference to the accompanying drawings.

Figure 3:
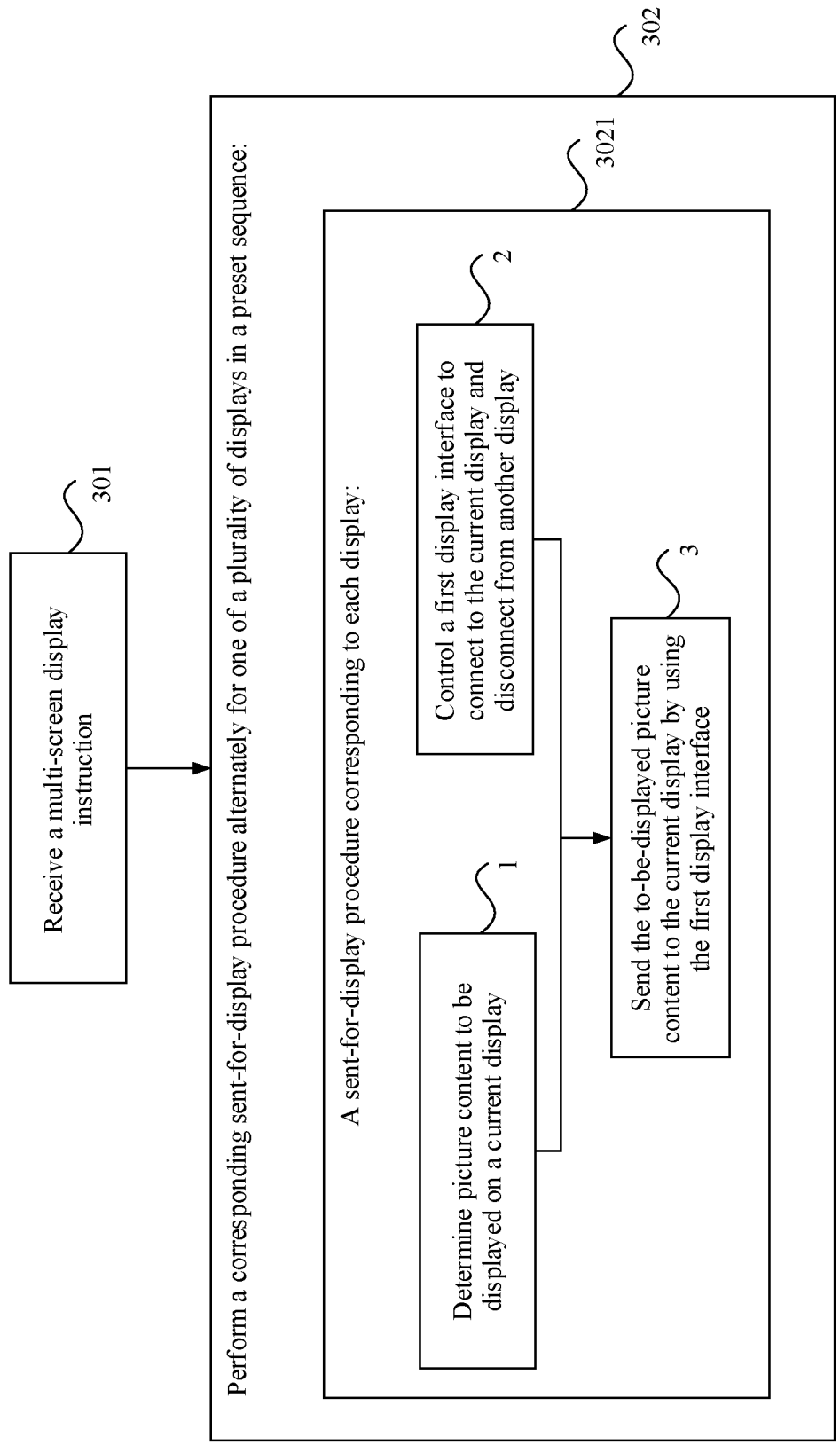
FIG. 3 is a schematic flowchart 1 of a screen display method according to an embodiment of this application.

As shown in FIG. 3, an embodiment of this application provides a screen display method. The method may be applied to an electronic device including at least two displays and a processor provided with a first display interface, for example, may be implemented by the electronic device shown in FIG. 1 or FIG. 2a and FIG. 2b. The method includes the following steps.

Step 301: Receive a multi-screen display instruction.

The multi-screen display instruction instructs the at least two displays to separately display corresponding picture content. The multi-screen display instruction may be generated by a processing unit of the processor 100 shown in FIG. 1. When a user performs a specified preset operation on the electronic device, for example, the user taps an icon, makes a sound instruction, or taps the display twice by using a knuckle (including but not limited to the foregoing examples), the electronic device determines that the multi-screen display instruction is received when receiving the specified operation.

In an optional implementation, after receiving an operation of tapping a specified icon on a screen by the user, a first processing unit of the processor 100 determines that the multi-screen display instruction is received, and then the first processing unit sends the multi-screen display instruction to a second processing unit of the processor 100, and the second processing unit receives the multi-screen display instruction.

In an optional implementation, the first display 101 is a display in a touchscreen, and the touchscreen further includes a touch sensor. Correspondingly, the receiving a multi-screen display instruction in step 301 may include:

Step 3011: Receive a specified operation performed by the user on the touchscreen.

The specified operation may be a specific touch operation for the touchscreen, and may include one touch action or a combination of a plurality of touch actions. The specified operation may be performed on a specified operation object, which may be a specific icon, a specific area, or the like displayed on the touchscreen. Correspondingly, the specified operation may be a specific gesture action such as tap, slide, or double-tap that is performed on the specific icon or the specific area.

Step 3012: In response to the specified operation, determine that the multi-screen display instruction is received.

After receiving the specified operation, the processor of the electronic device determines that the multi-screen display instruction is received.

Figure 4A:
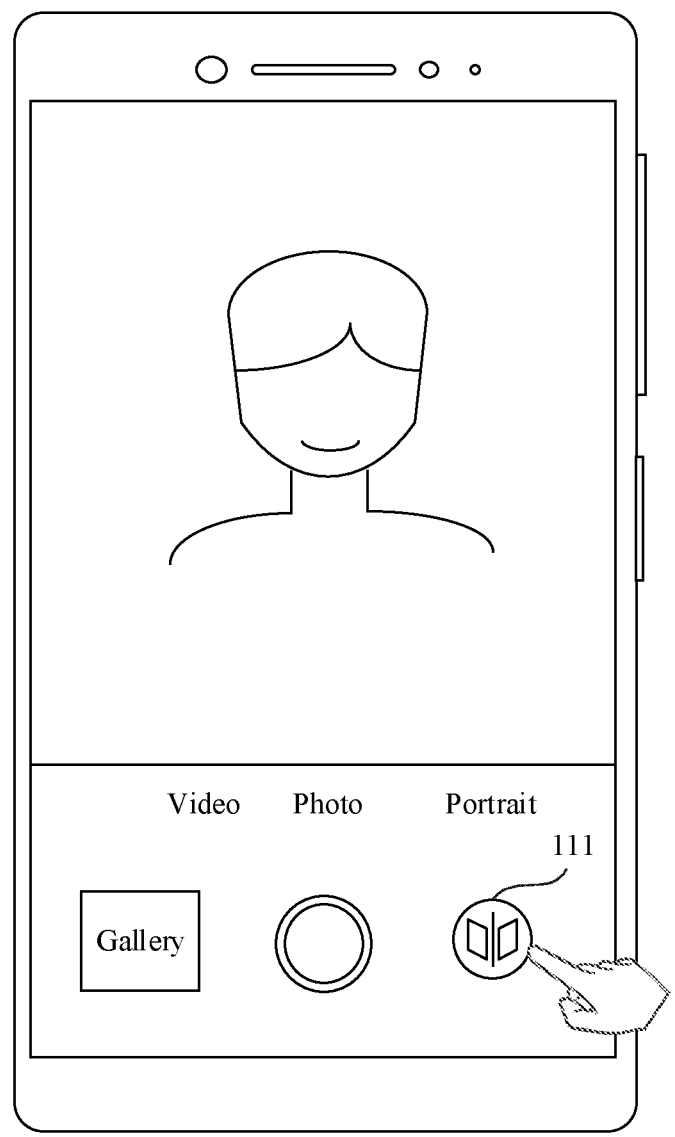
FIG. 4a is a schematic interaction diagram 3 of a screen display method according to an embodiment of this application.

For example, the user taps an icon 110 on a mobile phone interface shown in FIG. 2*a* to start Camera, so that the first display 101 of the mobile phone displays a picture shown in FIG. 4*a*. Further, the user may tap an icon 111 on a mobile phone interface shown in FIG. 4*a*, to send a multi-screen display instruction to the mobile phone. The multi-screen display instruction instructs to display, by using the first display 101 and the second display 102, at least a framed picture captured by a camera lens (it should be noted that the framed picture is a current real-time framed picture of the camera lens, and is not a photo stored in an album in the mobile phone). After listening to a touch event and further determining that an operation of the received touch event is an operation of tapping the icon 111 by the user, the processor 100 of the mobile phone determines that the multi-screen display instruction is received.

Figure 4B:
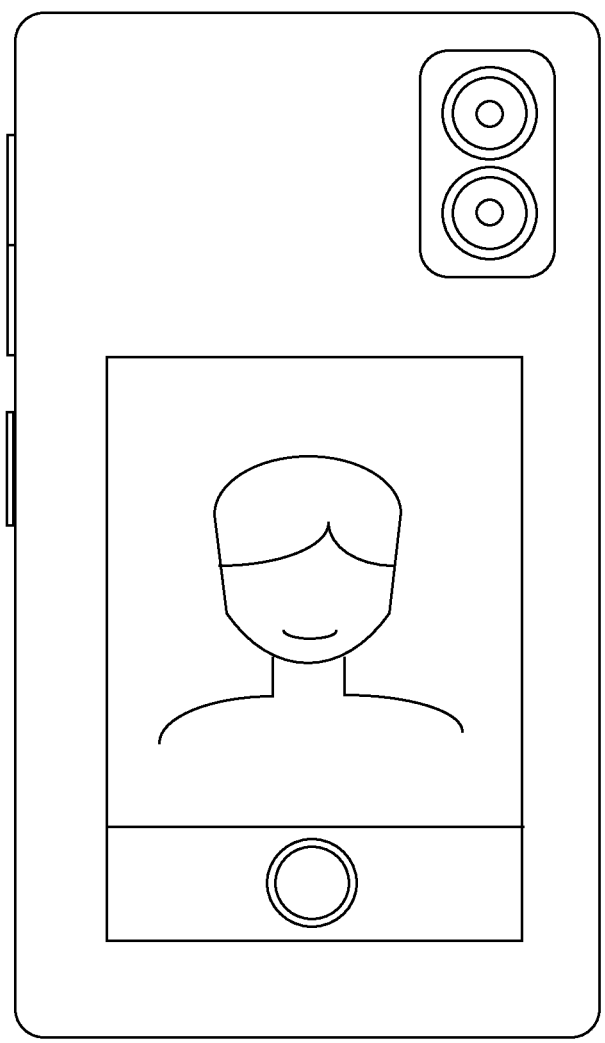
FIG. 4b is a schematic interaction diagram 4 of a screen display method according to an embodiment of this application.

In the foregoing example, picture content displayed on the first display 101 and the second display 102 may not be completely the same. For example, as shown in FIG. 4*b*, the picture content displayed on the second display 102 includes only one shooting icon of a camera and a scene picture shot by the camera. Compared with the picture content displayed on the first display 101 shown in FIG. 4*a*, the picture content displayed on the second display 102 shown in FIG. 4*b* does not include some function icons.

In some optional examples, the multi-screen display instruction may instruct only parts of the at least two displays to separately display corresponding picture content. Alternatively, in some other optional examples, the multi-screen display instruction may instruct the entire displays to separately display corresponding picture content. Picture content displayed on each display may be the same, or may be different.

It should be noted that the picture content is content included in a picture displayed on the display: For example, as shown in FIG. 2*a*, picture content displayed on the first display 101 of the mobile phone includes a background wallpaper of a home screen, time and date, weather, mobile signal strength, a battery level, application icons, and the like. The picture content may be determined by the processor 100. A file format carrying picture content information may be any pre-specified format. For example, the file may carry an RGB (red, green, and blue) pixel value of each pixel.

Step 302: Perform a corresponding sent-for-display procedure alternately for one of the at least two displays in a preset sequence.

The preset sequence is a preset sequence of alternating sent-for-display. Sent-for-display is a step of sending display data generated for a display to the corresponding display. In this embodiment of this application, the sent-for-display procedure includes a process of generating corresponding display data for a display and sending the display data to the display.

After the multi-screen display instruction is received, specific displays that are indicated by the multi-screen display instruction to simultaneously display a picture may be determined, then an alternating sent-for-display sequence for the specific displays is determined to obtain the preset sequence, and further, a corresponding sent-for-display procedure is performed at a sequence of each display.

Specifically, the performing a corresponding sent-for-display procedure alternately for one of the at least two displays in a preset sequence in step 302 includes step 3021: a sent-for-display procedure corresponding to each display. Further, the sent-for-display procedure corresponding to each display in step 3021 includes the following steps 1 to 3:

Step 1: Determine picture content to be displayed on a current display.

The current display is a display to which a current round is performed. The picture content to be displayed is picture content that currently needs to be displayed on the display:

Step 2: Control the first display interface 1001 to connect to the current display and disconnect from another display.

To be specific, at a same moment, the first display interface 1001 is connected to only one display, and is disconnected from another display. A connected state and a disconnected state are states of a communication connection used to send display data. In the connected state, the communication connection can transmit display data. In the disconnected state, the communication connection cannot transmit display data.

The processor of the electronic device includes the first display interface 1001. The first display interface 1001 may be a DSI interface, and sent display data is DSI protocol-based data.

Connection and disconnection of a communication connection between the first display interface 1001 and the at least two displays may be controlled by the switch circuit 103, and the communication connection between each display and the first display interface 1001 is used to transmit display data. Correspondingly, step 2 may be implemented by controlling the switch circuit 103. For example, the processor 100 sends a control signal to the switch circuit 103 by using the control end 1002, so that after the switch circuit 103 receives the control signal, the switch circuit 103 connects the first display interface 1001 to the current display; and disconnects a communication connection to the another display.

After step 1 and step 2 are performed, step 3 is performed: sending the to-be-displayed picture content to the current display by using the first display interface 1001.

To be specific, step 1 and step 2 may be performed at the same time or performed in a sequence (a specific sequence may not be limited). However, before step 3 is performed, step 1 and step 2 need to be performed.

It should be noted that, if picture content displayed on two displays is the same, it does not mean that display data received by the two displays is the same. Because screen display configuration parameters such as a hardware size of a display and a resolution and a color mode that are set for each display are different, the display data received by each display may be display data obtained after the processor 100 performs corresponding conversion processing on to-be-displayed picture content, so that each display displays a corresponding picture effect based on the corresponding screen display configuration parameters. Correspondingly, the determining picture content to be displayed on a current display in step 1 may include: configuring the picture content to be displayed as corresponding display data based on the screen display configuration parameter of the current display: and the sending the to-be-displayed picture content to the current display by using the first display interface in step 3 may include: sending the display data to the current display by using the first display interface. To be specific, the step of determining the picture content in step 1 may be specifically converting the picture content based on the screen display configuration parameter of the current display, and converting the picture content into display data corresponding to the screen display configuration parameter of the display, for example, processing a pixel value, calculating a pixel value obtained through conversion based on an algorithm of a color mode corresponding to the current display, and processing a file of the display data based on a resolution of the display.

Optionally, corresponding execution duration is configured for a sent-for-display procedure corresponding to each display. Optionally, the execution duration of the sent-for-display procedure corresponding to each display may be different. Optionally, the execution duration of the sent-for-display procedure corresponding to each display may be configured. For example, before step 302 is performed, the following steps are performed.

Step 601: Receive configuration data input for the execution duration of the sent-for-display procedure of each display.

Step 602: Configure the execution duration of the sent-for-display procedure of each display based on the input configuration data.

In a possible implementation, the execution duration corresponding to the sent-for-display procedure corresponding to each display may be a multiple of a clock cycle. The clock cycle may be a clock cycle of the processor 100, or a refresh cycle of the display. To prevent a tearing effect (Tearing Effect, TE for short) screen refresh clock cycle, in this implementation, before step 302 is performed, a refresh cycle of each display may be configured as a same clock cycle, that is, all displays are controlled to refresh screens at a same frequency (for example, 60 Hz).

In some possible implementations of this embodiment of this application, the sent-for-display procedure corresponding to each display in step 3021 may be different, and a difference may include one or more of the following cases:

(1) Execution duration of sent-for-display procedures corresponding to different displays is different.

(2) In sent-for-display procedures corresponding to different displays, execution sequences of included steps are different. For example, in a sent-for-display procedure of the first display 101, step 1, step 2, and step 3 are performed in sequence, while in a sent-for-display procedure of the second display 102, step 1 and step 2 are performed synchronously, and then step 3 is performed.

(3) Execution duration of each step in the sent-for-display procedures corresponding to different displays is different. For example, in the sent-for-display procedure of the first display 101, execution duration of step 1 is two clock cycles (the clock cycle may be the clock cycle of the processor 100 or a cycle corresponding to a screen refresh frequency of the first display 101), and in the sent-for-display procedure of the second display 102, execution duration of step 1 is three clock cycles.

In this embodiment of this application, the at least two displays of the electronic device provide display data by using the first display interface 1001. To enable different displays to display different picture content, in this embodiment of this application, a time division multiplexing principle is used for the sent-for-display procedure and the first display interface 1001. In other words, after determining a display to which a current round is performed, the processor 100 generates corresponding picture content only for the display within duration of the sent-for-display procedure, and then sends the generated to-be-displayed picture content to the display by using the first display interface 1001 after the first display interface 1001 is connected to the display, so as to resolve a technical problem in a related technology that one display interface cannot be used to provide different display data for at least two displays. Corresponding display data is generated for a corresponding display in different time periods by using a time division multiplexing policy, and the same display interface is connected to the corresponding display in the time period to send the display data to the corresponding display. This achieves a technical effect that different display data can be provided for the at least two displays by using one display interface. It should be noted that, in the technical solution provided in this embodiment of this application, same display data may alternatively be provided for different displays by using one display interface based on a time-division sending principle. This is not specifically limited in this embodiment of this application.

Figure 5:
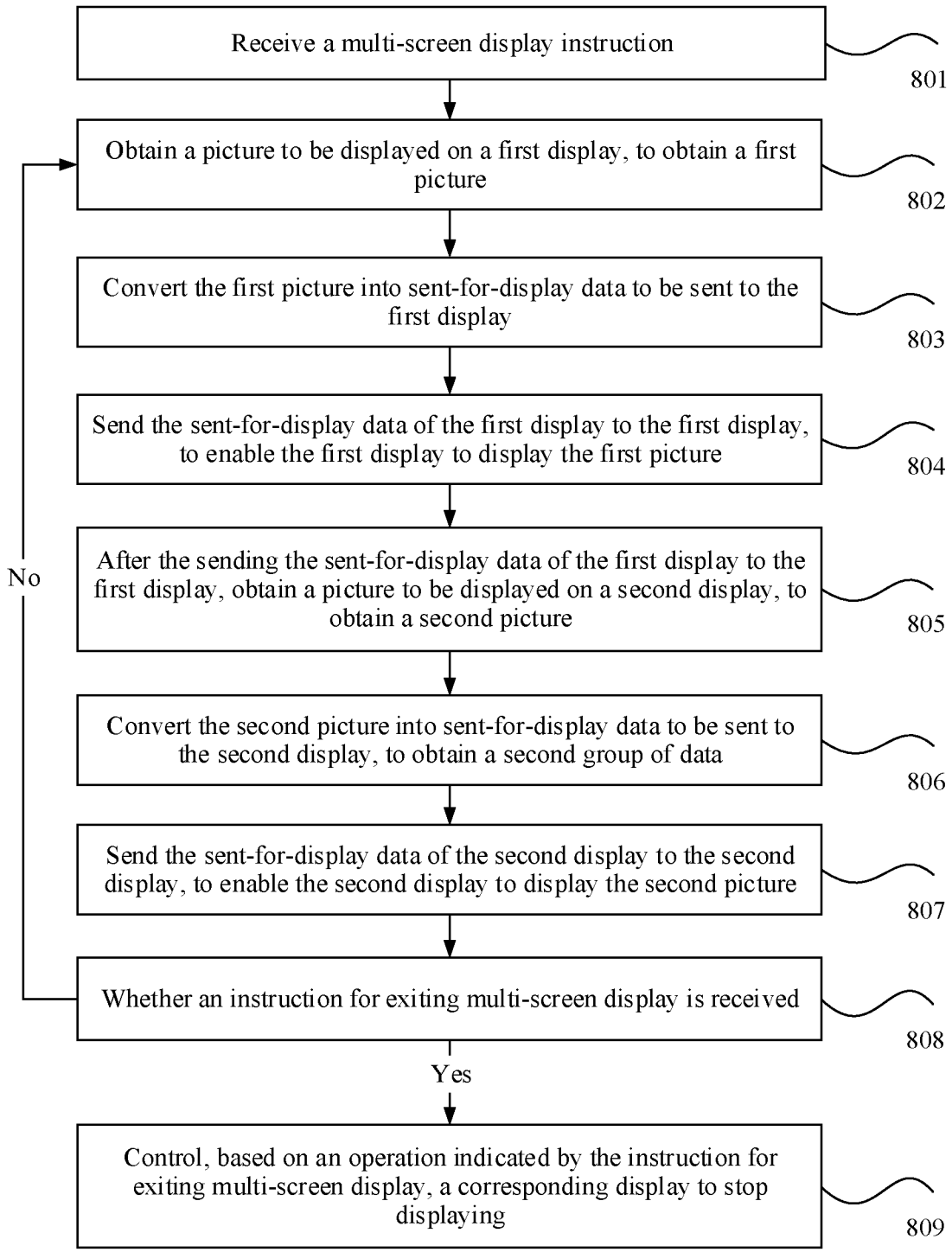
FIG. 5 is a schematic flowchart 2 of a screen display method according to an embodiment of this application.

The following describes an execution process of a screen display method in an embodiment of this application in a specific application scenario with reference to FIG. 5. As shown in FIG. 5, the screen display method in this embodiment of this application includes the following steps.

Step 801: Receive a multi-screen display instruction.

The multi-screen display instruction instructs at least two displays (including a first display and a second display) to separately display corresponding pictures. The screen display method provided in this application may be applied to an electronic device provided with at least two displays. For example, the method provided in this application is performed by the foregoing electronic device. When a user performs a specified preset operation on the electronic device, for example, the user taps an icon, makes a sound instruction, or taps the display twice by using a knuckle (including but not limited to the foregoing examples), and when the electronic device receives the specified operation, the electronic device determines that the multi-screen display instruction is received, and separately displays corresponding pictures on the at least two displays. Optionally, a picture displayed on each display may be indicated by the foregoing preset operation, for example, first tapping of the first display and the second display indicates that content displayed on the first display is synchronously displayed on the second display.

Step 802: Obtain a picture to be displayed on the first display, to obtain a first picture.

The picture to be displayed on the first display may be indicated by the multi-screen display instruction.

For example, after opening an interface of video application software on the first display, the user selects a video for playing, and taps a function icon on a playback interface. The electronic device receives a multi-screen display instruction. The multi-screen display instruction instructs to play the video on the first display and the second display. In this case, pictures to be displayed on the first display and the second display are a playback interface of the video.

Optionally, the pictures of the first display and the second display may be different. For example, after the first display and the second display the playback interface of the video, the user may drag a progress bar on the first display, so that a video playback progress on the first display is different from a video playback progress on the second display.

The picture to be displayed on the first display may be generated by a processor. For example, the processor synthesizes all application software to be displayed on the front end and a layer of an operating system, to obtain a frame of picture to be displayed.

Step 803: Convert the first picture into sent-for-display data to be sent to the first display.

Because screen configuration parameters (of hardware and/or software) such as drive circuits and resolutions of the displays may be different, after the processor generates the first picture, the processor may convert, based on the configuration parameter of the first display, the first picture into sent-for-display data that can be identified by the first display.

Step 804: Send the sent-for-display data of the first display to the first display, to enable the first display to display the first picture.

After a first group of data is obtained, the first group of data is sent to the first display.

In an optional application scenario, only one display interface is configured for the processor (for example, in the scenario shown in FIG. 1, the processor 100 includes the first display interface 1001), and the processor sends sent-for-display data to the outside by using a first display interface.

To connect the at least two displays, the first display interface and the at least two displays may be connected by using a switching module.

The switching module may be a hardware module, for example, may be the switch circuit 103 shown in FIG. 1, or may be a selection circuit. The switching module may select one display from the at least two displays to establish a communication connection to the first display interface. Alternatively, the switching module may be a software module. In the foregoing optional application scenario, before step 804 is performed, a first control signal needs to be sent to the switching module, where the first control signal is used to control the switching module to establish a first communication connection to the first display, and the first communication connection is used to transmit the sent-for-display data of the first display.

Optionally, when step 803 is performed, the first picture may be converted into the sent-for-display data of the first display based on the screen configuration parameter of the first display. Further, the sent-for-display data of the first display may be sent according to a communication protocol corresponding to the first communication connection. The communication protocol may be a display serial interface DSI protocol in a mobile industry processor interface MIPI protocol.

Optionally, after the first display displays the first picture, and before next sent-for-display data is received, the first display keeps displaying the first picture unchanged. Specifically, the first display may include a buffer module that buffers received sent-for-display data, to read the buffered sent-for-display data during each refresh based on a refresh frequency of the first display, so as to keep displaying the first picture. When the first display receives the next sent-for-display data, the first display switches the displayed picture. After the first display receives the sent-for-display data, the first display may cover the sent-for-display data of a previous frame of picture stored in the buffer module, and display the currently received sent-for-display data while receiving the sent-for-display data.

Step 805: After performing step 804 of the sending the sent-for-display data of the first display to the first display, obtain a picture to be displayed on the second display, to obtain a second picture.

Step 806: Convert the second picture into sent-for-display data to be sent to the second display.

Step 807: Send the sent-for-display data of the second display to the second display, to enable the second display to display the second picture.

For step 805 to step 807, refer to the descriptions of step 802 to step 804. Details are not described herein again.

After step 807 is performed, step 808 may be performed to determine whether an instruction for exiting multi-screen display is received. If no instruction for exiting multi-screen display is received, step 802 may be performed. If the instruction for exiting multi-screen display is received, step 809 may be performed to control, based on an operation indicated by the instruction, a corresponding display to stop displaying. For example, the instruction for exiting multi-screen display may be stopping display on the first display, stopping display on the second display, or stopping display on the first display and the second display. After any display stops displaying, the step of obtaining a picture of the display and generating sent-for-display data for display is stopped.

Optionally, if there is a third display, and the multi-screen display instruction instructs the first display to the third display to perform displaying, sent-for-display data may be cyclically processed and sent for display in a sequence of the first display→the second display→the third display: Optionally, another sequence may be used for arrangement. For example, in a cycle, some displays may be processed for a plurality of times. For example, a sequence of a cycle is the first display→the third display→the third display→the second display: This is not specifically limited in this embodiment of this application.

In a possible implementation, the receiving a multi-screen display instruction in step 801 may be implemented in the following manner. First, a first operation used to indicate to display a first camera function page on the first display is received. For example, when the user taps a "Camera" function icon on a home screen icon displayed on the first display, the first operation is received, and the first camera function page is displayed on the first display in response to the first operation. The first camera function interface may include a framed picture captured by a camera lens in real time. The first display may display, in real time, a picture framed by the camera lens. Optionally, the first camera function interface may further include some function icons, for example, icons of controls for selecting a filter, configuring a camera parameter, and the like. After the first camera function page is displayed, a second operation used to indicate to display a second camera function page on the second display is received on the first camera function page. For example, the user may tap, on the first camera function page, an icon of a control used to indicate to display a real-time camera picture on the second display. The mobile phone receives the second operation, and displays the second camera function page on the second display in response to the second operation. The second camera function interface may include a framed picture captured by the camera lens in real time. Optionally, the second camera function interface may further include some function icons, and the second camera function interface and the first camera function interface may be different.

Correspondingly, the obtaining a picture to be displayed on the first display in step 802 may be obtaining a first framed picture captured by the camera lens. It should be noted that the framed picture is a current real-time framed picture of the camera lens, and is not a picture stored in an album in the mobile phone. After the first framed picture is obtained, the first camera function page is generated based on the first framed picture. Similarly, the obtaining a picture to be displayed on the second display in step 805 includes: obtaining a second framed picture captured by the camera lens: and generating the second camera function page based on the second framed picture.

According to the method provided in this embodiment of this application, a generation process and a sent-for-display process of a next group of sent-for-display data are performed only after a generation process and a sent-for-display process of a group of sent-for-display data are completed. Because the sent-for-display process also takes a specific period of time, after the group of sent-for-display data is sent for display, a picture is obtained to generate sent-for-display data, and a case can be avoided in which sent-for-display data is stacked in a buffer because a picture corresponding to the sent-for-display data generated by the processor is not in real time or the sent-for-display data generated by the processor cannot be sent out in time, and data processing pressure of the processor can be reduced. This may be applied to an application scenario in which the processor of the electronic device has only one display interface to output sent-for-display data to each display.

Figure 6:
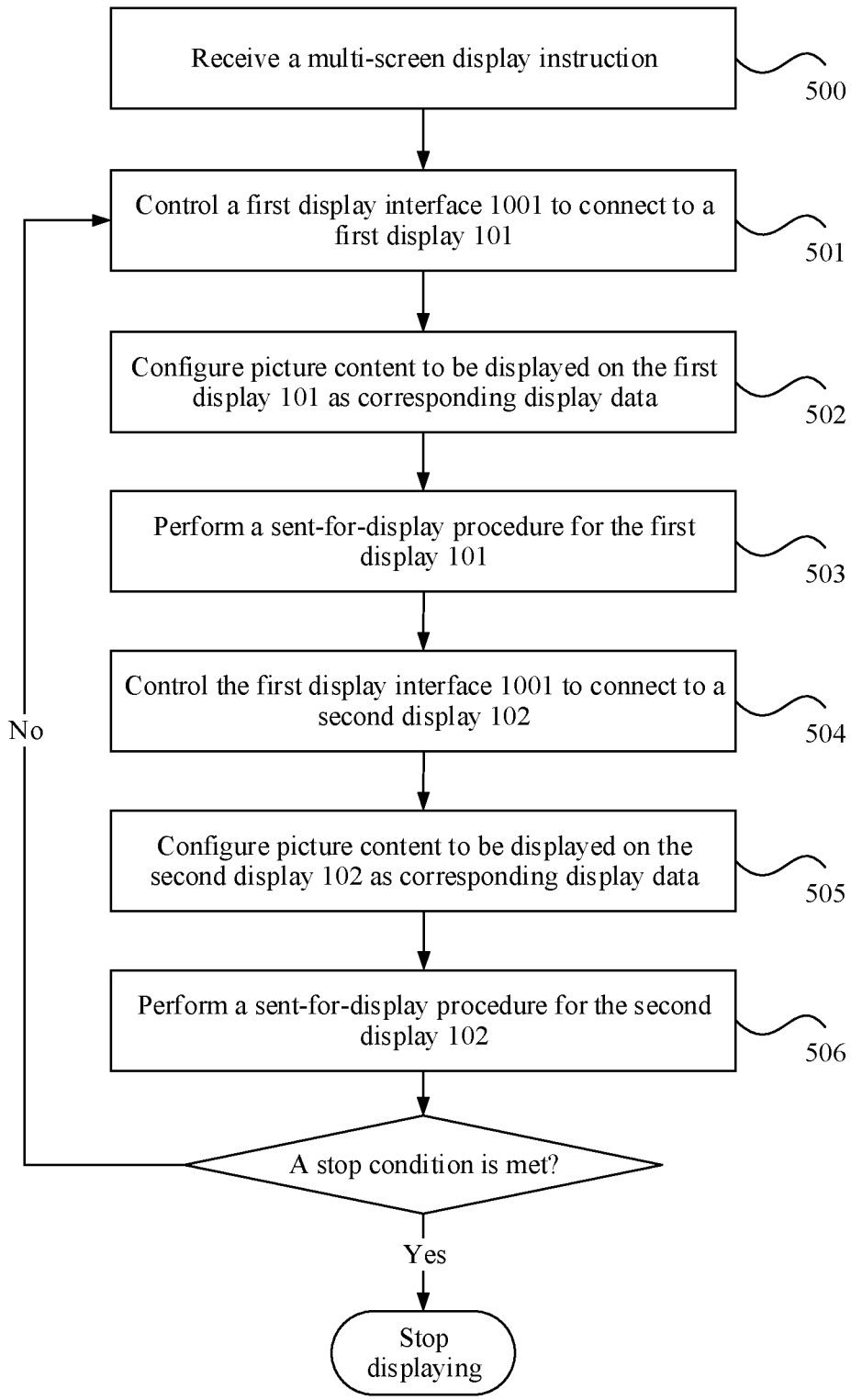
FIG. 6 is a schematic flowchart 3 of a screen display method according to an embodiment of this application.
Figure 7:
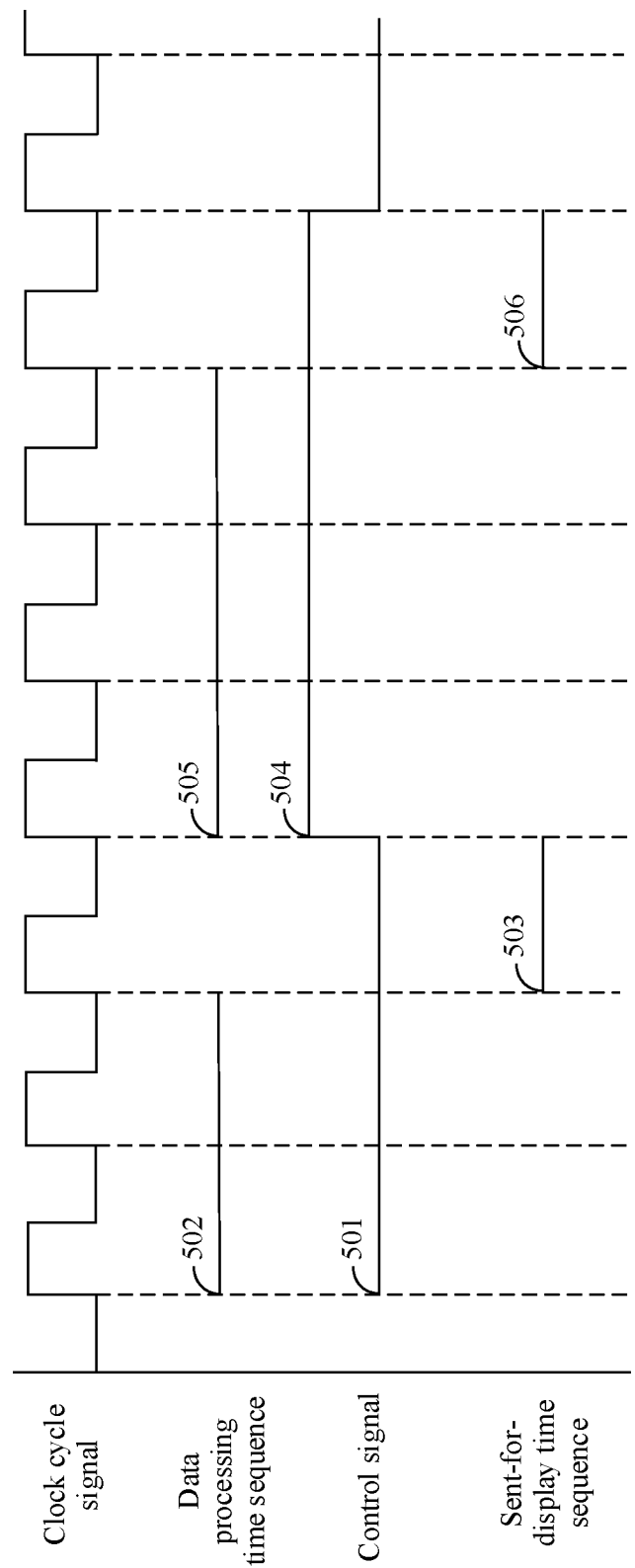
FIG. 7 is a schematic diagram of a time sequence of a screen display method according to an embodiment of this application.

The following describes an execution process of a screen display method in an embodiment of this application in a specific application scenario with reference to FIG. 1, FIG. 6, and FIG. 7. As shown in FIG. 6, the screen display method in this embodiment of this application includes the following steps.

Step 500: Receive a multi-screen display instruction.

Step 501: Send a low-level control signal to the switch circuit 103 at a rising edge of the first clock cycle after the multi-screen display instruction is received, to control the first display interface 1001 to connect to the first display 101 and disconnect a communication connection between the first display interface 1001 and the second display 102. As shown in FIG. 7, the low-level control signal lasts for three clock cycles.

It should be noted that, in another implementation, the low-level control signal may alternatively be triggered and sent at a rising edge of the second clock cycle in a sent-for-display procedure for the first display 101, or may be triggered and sent at a falling edge of the first clock cycle, as long as the switch circuit 103 can be in a corresponding connected state before step 503 is performed. This example is merely used as an example, and does not constitute a limitation on this application. The sent-for-display procedure for the second display 102 is similar, and details are not described again.

Step 502: Configure, based on a screen display configuration parameter of the first display 101, picture content to be displayed on the first display 101 as corresponding display data, to obtain first display data. As shown in FIG. 7, duration of configuring display data for the first display 101 is two clock cycles. Different configuration duration may be set in different implementations. This example is merely used as an example, and does not constitute a limitation on this application. A sent-for-display procedure for the second display 102 is similar, and details are not described again.

Step 503: Send the first display data to the first display 101, that is, perform a sent-for-display procedure for the first display 101. As shown in FIG. 7, step 503 is performed after step 501 and step 502 are completed, and step 503 is performed in the third clock cycle of the sent-for-display procedure of the first display 101. The sent-for-display procedure of the first display 101 is three clock cycles. Execution duration of different sent-for-display procedures may be set in different implementations. This example is merely used as an example, and does not constitute a limitation on this application. The sent-for-display procedure for the second display 102 is similar, and details are not described again.

When step 503 is performed, the first display data is data used by the first display 101 to display one frame of image. The first display 101 receives the first display data by using the second display interface 1011 of the first display drive circuit 1010. After receiving a part of display data in the frame of image, the first display drive circuit 1010 may start displaying, and control, based on the received display data, a light emitting element in a corresponding position on the first display 101 to emit light in a corresponding color.

Step 504: Send a high-level control signal to the switch circuit 103, to control the first display interface 1001 to connect to the second display 102, and disconnect a communication connection between the first display interface 1001 and the first display 101. As shown in FIG. 7, the high-level control signal lasts for four clock cycles.

Step 505: Configure, based on a screen display configuration parameter of the second display 102, picture content to be displayed on the second display 102 as corresponding display data, to obtain second display data. As shown in FIG. 7, duration of configuring display data for the second display 102 is three clock cycles.

Step 506: Send the second display data to the second display 102, that is, perform a sent-for-display procedure for the second display 102. As shown in FIG. 7, step 506 is performed after step 504 and step 505 are completed, and step 506 is performed in the fourth clock cycle of the sent-for-display procedure of the second display 102. The sent-for-display procedure of the second display 102 is four clock cycles.

When step 506 is performed, the second display data is data used by the second display 102 to display one frame of image. The second display 102 may receive the second display data by using a second display interface 1021 of the second display drive circuit 1020. After receiving a part of display data in the frame of image, the second display drive circuit 1020 may start displaying, and control, based on the received display data, a light emitting element in a corresponding position on the first display 101 to emit light in a corresponding color.

Step 501 to step 506 are a complete cycle procedure in which the two displays perform screen display: After step 506 is performed, step 501 to step 506 are repeatedly performed until a stop condition is met. For example, the stop condition may be that a user performs an operation corresponding to a multi-screen display cancellation instruction, or the user presses a power-off button to turn off all screens.

It should be noted that screen refresh frequencies of the first display 101 and the second display 102 are one refresh in each clock cycle. In other words, the first display 101 and the second display 102 need to refresh and display data of one frame of picture content in each clock cycle. Generally, a refresh frequency of a display is 60 Hz, and each clock cycle is 16.7 ms.

In this case, for a cycle procedure (including seven clock cycles) of step 501 to step 506, only when step 503 of sending for display is performed, the first display 101 receives display data of a frame of new picture content. Before a clock cycle in which step 503 is performed, the first display 101 displays picture content updated in step 503 in a previous cycle procedure each time the first display 101 is refreshed. The display data is stored by the first display drive circuit 1010. After the clock cycle in which step 503 is performed, the first display 101 displays picture content updated in step 503 each time the first display 101 is refreshed. Similarly, before step 506, picture content displayed on the second display 102 remains unchanged, and the second display drive circuit 1020 stores picture content updated in step 506 in a previous cycle procedure. In each cycle procedure, each time the clock cycle is refreshed, the second display 102 performs displaying based on the display data stored by the second display drive circuit 1020.

It should be noted that, if the second display 102 is not turned on before step 500, in the first cycle procedure, the second display 102 is still in a screen-off state before step 506 is performed, and the second display 102 is turned on when step 506 is performed, and starts to display the received display data.

It may be understood that some or all of the steps or operations in the foregoing embodiments are merely examples. Other operations or variations of various operations may be performed in embodiments of this application. In addition, the steps may be performed in a sequence different from that presented in the foregoing embodiments, and not all operations in the foregoing embodiments may need to be performed.

Figure 8:
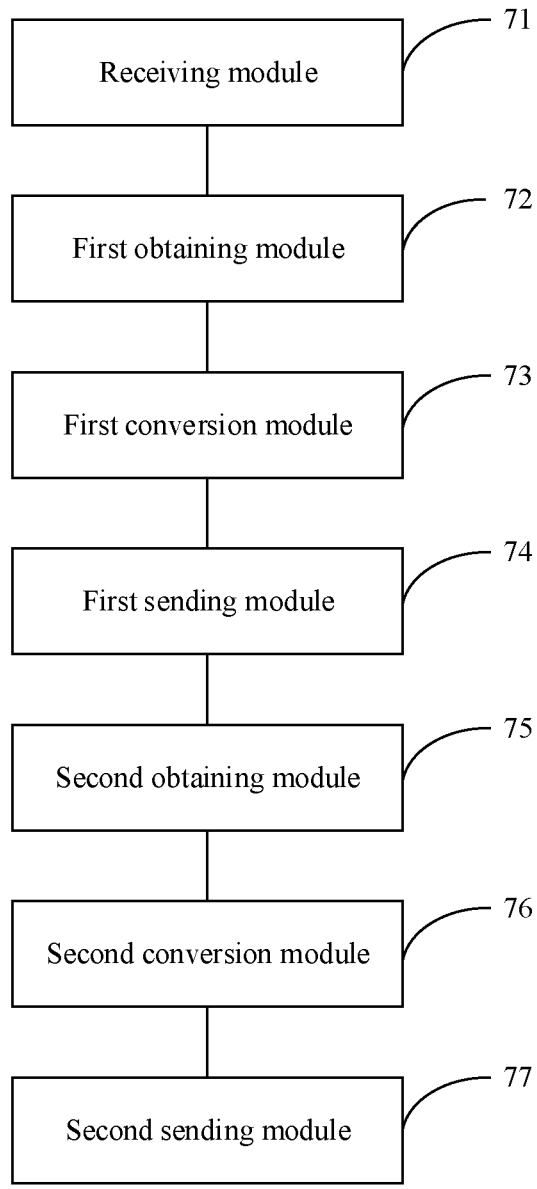
FIG. 8 is a schematic diagram of a structure of a screen display apparatus according to an embodiment of this application.

FIG. 8 is a schematic diagram of a structure of a screen display apparatus according to an embodiment of this application. As shown in FIG. 8, the apparatus may include a receiving module 71, a first obtaining module 72, a first conversion module 73, a first sending module 74, a second obtaining module 75, a second conversion module 76, and a second sending module 77. It should be understood that the apparatus may correspond to an electronic device 900 shown in FIG. 9), and a function of each module or unit may be specifically implemented by a processor 910 in the electronic device 900 shown in FIG. 9.

The receiving module 71 is configured to receive a multi-screen display instruction, where the multi-screen display instruction instructs at least two displays to separately display corresponding pictures. The first obtaining module 72 is configured to obtain a picture to be displayed on a first display, to obtain a first picture. The first conversion module 73 is configured to convert the first picture into sent-for-display data to be sent to the first display. The first sending module 74 is configured to send the sent-for-display data of the first display to the first display, to enable the first display to display the first picture. The second obtaining module 75 is configured to: after the sent-for-display data of the first display is sent to the first display, obtain a picture to be displayed on a second display, to obtain a second picture. The second conversion module 76 is configured to convert the second picture into sent-for-display data to be sent to the second display. The second sending module 77 is configured to send the sent-for-display data of the second display to the second display; to enable the second display to display the second picture.

In a possible implementation, the apparatus further includes: a third sending module, configured to: before the sent-for-display data of the first display is sent to the first display, send a first control signal to a switching module, where the first control signal is used to control the switching module to establish a first communication connection to the first display, and the first communication connection is used to transmit the sent-for-display data of the first display: and a fourth sending module, configured to: before the sent-for-display data of the second display is sent to the second display, send a second control signal to the switching module, where the second control signal is used to control the switching module to establish a second communication connection to the second display, and the second communication connection is used to transmit the sent-for-display data of the second display.

In a possible implementation, the first conversion module 73 includes: a first generation unit, configured to generate, based on a screen configuration parameter of the first display, the sent-for-display data corresponding to the first picture. The second conversion module 76 includes: a second generation unit, configured to generate, based on a screen configuration parameter of the second display, the sent-for-display data corresponding to the second picture.

In a possible implementation, the first sending module 74 is further configured to send the sent-for-display data of the first display according to a communication protocol of the first communication connection. The second sending module 77 is further configured to send the sent-for-display data of the second display according to a communication protocol of the second communication connection.

In a possible implementation, the communication protocol of the first communication connection and the communication protocol of the second communication connection are a display serial interface DSI protocol in a mobile industry processor interface MIPI protocol.

In a possible implementation, the receiving module 71 includes: a first receiving unit, configured to receive a first operation used to indicate to display a first camera function page on the first display: a first display unit, configured to display the first camera function page on the first display in response to the first operation: a second receiving unit, configured to receive, on the first camera function page, a second operation used to indicate to display a second camera function page on the second display: and a second display unit, configured to display the second camera function page on the second display in response to the second operation.

In a possible implementation, the first obtaining module 72 includes: a first obtaining unit, configured to obtain a first framed picture captured by a camera lens: and a first generation unit, configured to generate the first camera function page based on the first framed picture. The second obtaining module 75 includes: a second obtaining unit, configured to obtain a second framed picture captured by the camera lens: and a second generation unit, configured to generate the second camera function page based on the second framed picture.

In a possible implementation, the apparatus further includes: a first display module, configured to: after the first display displays the first picture, switch a displayed picture when the first display receives next sent-for-display data: and a second display module, configured to: after the second display displays the second picture, switch a displayed picture when the second display receives a next group of sent-for-display data.

The screen display apparatus provided in the embodiment shown in FIG. 8 may be configured to perform the technical solutions in the method embodiments shown in FIG. 3, FIG. 5, and FIG. 6 of this application. For an implementation principle and a technical effect of the screen display apparatus, further refer to related descriptions in the method embodiments.

It should be understood that division into the foregoing modules of the screen display apparatus shown in FIG. 8 is merely logical function division. In an actual implementation, all or some of the modules may be integrated into one physical entity, or may be physically separated. In addition, all of the modules may be implemented in a form of software invoked by using a processing element or may be implemented in a form of hardware. Alternatively, some modules may be implemented in a form of software invoked by using the processing element, and some modules are implemented in a form of hardware. For example, the receiving module 71 may be a separately disposed processing element, or may be integrated into a chip of an electronic device for implementation. An implementation of another module is similar to the implementation of the receiving module 71. In addition, all or some of these modules may be integrated, or may be implemented independently. In an implementation process, steps in the foregoing methods or the foregoing modules can be implemented by using a hardware integrated logical circuit in the processing element, or by using instructions in a form of software.

For example, the foregoing modules may be one or more integrated circuits configured to implement the foregoing method, for example, one or more application-specific integrated circuits (Application Specific Integrated Circuits, ASICs for short below), one or more microprocessors (Digital Signal Processors, DSPs for short below), or one or more field programmable gate arrays (Field Programmable Gate Arrays, FPGAs for short below). For another example, the modules may be integrated together, and implemented in a form of a system-on-a-chip (System-On-a-Chip, SOC for short below).

Figure 9:
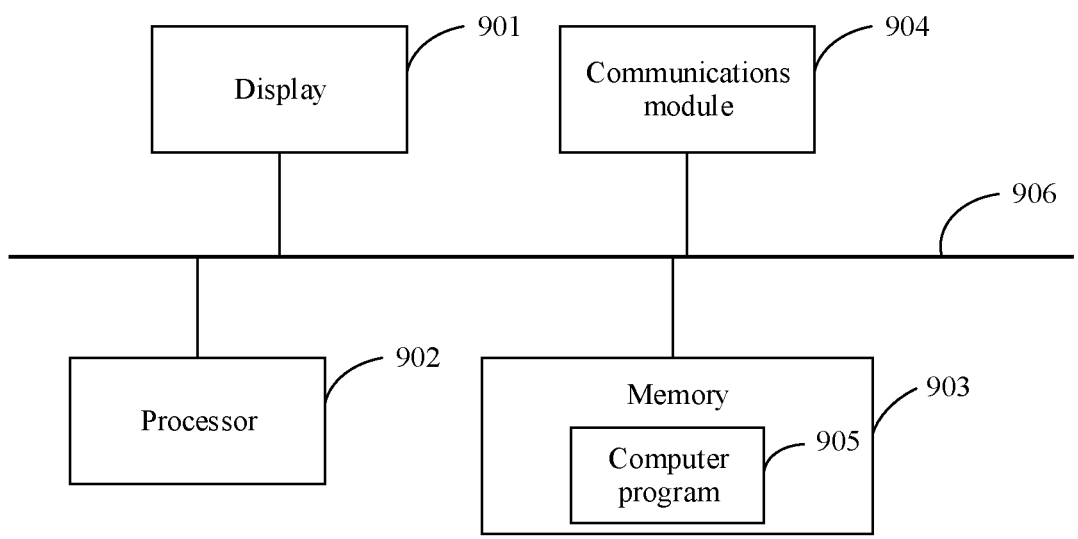
FIG. 9 is a schematic diagram 2 of a structure of an electronic device according to an embodiment of this application.

FIG. 9 is a schematic diagram of a structure of an electronic device according to an embodiment of this application. As shown in FIG. 9, the electronic device may include: at least two displays 901, one or more processors 902, one or more memories 903, a communications module 904, and one or more computer programs 905. The foregoing components may be connected by using one or more communications buses 906.

The display may include a display of an in-vehicle computer (mobile data center Mobile Data Center). The electronic device may be a device such as a mobile terminal (mobile phone), a smart screen, an uncrewed aerial vehicle, an intelligent connected vehicle (Intelligent Connected Vehicle, ICV for short), an intelligent vehicle (smart/intelligent car), or a vehicle-mounted device.

The one or more computer programs are stored in the one or more memories, the one or more computer programs include instructions, and when the instructions are executed by the electronic device, the electronic device is enabled to perform the following steps:
receiving a multi-screen display instruction, where the multi-screen display instruction instructs at least two displays to separately display corresponding pictures: obtaining a picture to be displayed on a first display, to obtain a first picture: converting the first picture into sent-for-display data to be sent to the first display: sending the sent-for-display data of the first display to the first display, to enable the first display to display the first picture: after sending a first group of data to the first display, obtaining a picture to be displayed on a second display, to obtain a second picture: converting the second picture into sent-for-display data to be sent to the second display; and sending the sent-for-display data of the second display to the second display, to enable the second display to display the second picture.

In a possible implementation, when the instructions are executed by the electronic device, the electronic device is enabled to perform, before the sending the sent-for-display data of the first display to the first display, the following step: sending a first control signal to a switching module, where the first control signal is used to control the switching module to establish a first communication connection to the first display, and the first communication connection is used to transmit the sent-for-display data of the first display. When the instructions are executed by the electronic device, the electronic device is enabled to perform, before the sending the sent-for-display data of the second display to the second display, the following step: sending a second control signal to the switching module, where the second control signal is used to control the switching module to establish a second communication connection to the second display, and the second communication connection is used to transmit the sent-for-display data of the second display.

In a possible implementation, when the instructions are executed by the electronic device, the electronic device is enabled to perform, when performing the converting the first picture into sent-for-display data to be sent to the first display, the following step: generating, based on a screen configuration parameter of the first display, the sent-for-display data corresponding to the first picture. When the instructions are executed by the electronic device, the electronic device is enabled to perform, when performing the converting the second picture into sent-for-display data to be sent to the second display, the following step: generating, based on a screen configuration parameter of the second display, the sent-for-display data corresponding to the second picture.

In a possible implementation, when the instructions are executed by the electronic device, the electronic device is enabled to perform, when performing the sending the sent-for-display data of the first display to the first display, the following step: sending the sent-for-display data of the first display according to a communication protocol of the first communication connection. When the instructions are executed by the electronic device, the electronic device is enabled to perform, when performing the sending the sent-for-display data of the second display to the second display, the following step: sending the sent-for-display data of the second display according to a communication protocol of the second communication connection.

In a possible implementation, the communication protocol of the first communication connection and the communication protocol of the second communication connection are a display serial interface DSI protocol in a mobile industry processor interface MIPI protocol.

In a possible implementation, when the instructions are executed by the electronic device, the electronic device is enabled to perform, when performing the receiving a multi-screen display instruction, the following steps: receiving a first operation used to indicate to display a first camera function page on the first display: displaying the first camera function page on the first display in response to the first operation: receiving, on the first camera function page, a second operation used to indicate to display a second camera function page on the second display: and displaying a second camera function page on the second display in response to the second operation.

In a possible implementation, when the instructions are executed by the electronic device, the electronic device is enabled to perform, when performing the obtaining a picture to be displayed on a first display, the following steps: obtaining a first framed picture captured by a camera lens: and generating the first camera function page based on the first framed picture. When the instructions are executed by the electronic device, the electronic device is enabled to perform, when performing the obtaining a picture to be displayed on a second display, the following steps: obtaining a second framed picture captured by the camera lens: and generating the second camera function page based on the second framed picture.

In a possible implementation, when the instructions are executed by the electronic device, the electronic device is enabled to perform the following: after the first display displays the first picture, the first display switches a displayed picture when receiving next sent-for-display data: and after the second display displays the second picture, the second display switches a displayed picture when receiving a next group of sent-for-display data.

An embodiment of this application further provides a computer-readable storage medium. The computer-readable storage medium stores a computer program. When the computer program is run on a computer, the computer is enabled to perform the methods provided in the embodiments shown in FIG. 3, and FIG. 5 or FIG. 6 in this application.

An embodiment of this application further provides a computer program product. The computer program product includes a computer program. When the computer program is run on a computer, the computer is enabled to perform the methods provided in the embodiments shown in FIG. 3, and FIG. 5 or FIG. 6 in this application.

In the embodiments of this application, "at least two" refers to two or more than two. A term "and/or" describes an association relationship between associated objects and indicates that three relationships may exist. For example, A and/or B may indicate the following cases: Only A exists, both A and B exist, and only B exists, where A and B may be singular or plural. The character "/" usually represents an "or" relationship between the associated objects. "At least one of the following" and a similar expression thereof refer to any combination of these items, including a single item or any combination of a plurality of items. For example, at least one of a, b, or c may indicate a, b, c, a and b, a and c, b and c, or a, b, and c, where a, b, and c may be singular or plural.

A person of ordinary skill in the art may be aware that, with reference to embodiments disclosed in this specification, described units and algorithm steps may be implemented by electronic hardware or a combination of computer software and electronic hardware. Whether the functions are performed by hardware or software depends on particular applications and design 20) constraint conditions of the technical solutions. A person skilled in the art may use different methods to implement the described functions for each particular application, but it should not be considered that the implementation goes beyond the scope of embodiments of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In embodiments of this application, when any of the functions is implemented in a form of a software function unit and sold or used as an independent product, the functions may be stored in a computer-readable storage medium. Based on such an understanding, the technical solutions of embodiments of this application essentially, or the part contributing to the conventional technology, or a part of the technical solutions may be implemented in a form of a software product. The computer software product is stored in a storage medium, and includes several instructions for instructing a computer device (which may be a personal computer, a server, a network device, or the like) to perform all or a part of the steps of the methods described in embodiments of this application. The foregoing storage medium includes: any medium that can store program code, such as a USB flash drive, a removable hard disk, a read-only memory (Read-Only Memory, ROM for short), a random access memory (Random Access Memory, RAM for short), a magnetic disk, or a compact disc.

The foregoing descriptions are merely specific implementations of embodiments of this application. Any variation or replacement readily figured out by a person skilled in the art within the technical scope disclosed in embodiments of this application shall fall within the protection scope in embodiments of this application. The protection scope of embodiments of this application shall be subject to the protection scope of the claims.

What is claimed is:

1. A screen display method, wherein the method comprises:
receiving a multi-screen display instruction, wherein the multi-screen display instruction instructs at least two displays to separately display corresponding pictures;
obtaining a first picture to be displayed on a first display of an electronic device;
converting the first picture into sent-for-display data to be sent to the first display;
sending the sent-for-display data of the first display to the first display, to enable the first display to display the first picture;
after sending the sent-for-display data of the first display to the first display, obtaining a second picture to be displayed on a second display of the electronic device;
converting the second picture into sent-for-display data to be sent to the second display; and
sending the sent-for-display data of the second display to the second display, to enable the second display to display the second picture; wherein
before sending the sent-for-display data of the first display to the first display, the method further comprises: sending a first control signal to a switching module, wherein the first control signal is used to control the switching module to establish a first communication connection to the first display, and the first communication connection is used to transmit the sent-for-display data of the first display; and
before sending the sent-for-display data of the second display to the second display, the method further comprises: sending a second control signal to the switching module, wherein the second control signal is used to control the switching module to establish a second communication connection to the second display, and the second communication connection is used to transmit the sent-for-display data of the second display; wherein the receiving the multi-screen display instruction comprises:
receiving a first operation that is used to indicate to display a first camera function page on the first display;

displaying the first camera function page on the first display in response to the first operation;

receiving, on the first camera function page, a second operation that is used to indicate to display a second camera function page on the second display; and displaying the second camera function page on the second display in response to the second operation.

2. The method according to claim 1, wherein the converting the first picture into the sent-for-display data to be sent to the first display comprises: generating, based on a screen configuration parameter of the first display, the sent-for-display data corresponding to the first picture; and the converting the second picture into the sent-for-display data to be sent to the second display comprises: generating, based on a screen configuration parameter of the second display, the sent-for-display data corresponding to the second picture.

3. The method according to claim 1, wherein the sending the sent-for-display data of the first display to the first display comprises: sending the sent-for-display data of the first display according to a communication protocol of the first communication connection; and the sending the sent-for-display data of the second display to the second display comprises: sending the sent-for-display data of the second display according to a communication protocol of the second communication connection.

4. The method according to claim 3, wherein the communication protocol of the first communication connection and the communication protocol of the second communication connection are a display serial interface (DSI) protocol in a mobile industry processor interface (MIPI) protocol.

5. The method according to claim 1, wherein the obtaining the picture to be displayed on the first display comprises: obtaining a first framed picture captured by a camera lens; and generating the first camera function page based on the first framed picture; and the obtaining the picture to be displayed on the second display comprises: obtaining a second framed picture captured by the camera lens; and generating the second camera function page based on the second framed picture.

6. The method according to claim 1, wherein after the first display displays the first picture, the first display switches a displayed picture when receiving next sent-for-display data; and after the second display displays the second picture, the second display switches a displayed picture when receiving a next group of sent-for-display data.

7. An electronic device, comprising:

at least two displays;

one or more processors;

one or more memories storing one or more computer programs comprising instructions that, when executed by the one or more processors, cause the electronic device to perform the following steps:

receiving a multi-screen display instruction, wherein the multi-screen display instruction instructs the at least two displays to separately display corresponding pictures;

obtaining a first picture to be displayed on a first display;

converting the first picture into sent-for-display data to be sent to the first display;

sending the sent-for-display data of the first display to the first display, to enable the first display to display the first picture;

after sending the sent-for-display data of the first display to the first display, obtaining a second picture to be displayed on a second display;

converting the second picture into sent-for-display data to be sent to the second display; and sending the sent-for-display data of the second display to the second display, to enable the second display to display the second picture; wherein before sending the sent-for-display data of the first display to the first display, the following step: sending a first control signal to a switching module, wherein the first control signal is used to control the switching module to establish a first communication connection to the first display, and the first communication connection is used to transmit the sent-for-display data of the first display; and before sending the sent-for-display data of the second display to the second display, the following step: sending a second control signal to the switching module, wherein the second control signal is used to control the switching module to establish a second communication connection to the second display, and the second communication connection is used to transmit the sent-for-display data of the second display; wherein when the instructions are executed by the electronic device, the electronic device is enabled to perform, when performing the receiving a multi-screen display instruction, the following steps:

receiving a first operation that is used to indicate to display a first camera function page on the first display;

displaying the first camera function page on the first display in response to the first operation;

receiving, on the first camera function page, a second operation that is used to indicate to display a second camera function page on the second display; and displaying the second camera function page on the second display in response to the second operation.

8. The electronic device according to claim 7, wherein when the instructions are executed by the electronic device, the electronic device is enabled to perform, when performing the converting the first picture into sent-for-display data to be sent to the first display, the following step: generating, based on a screen configuration parameter of the first display, the sent-for-display data corresponding to the first picture; and when the instructions are executed by the electronic device, the electronic device is enabled to perform, when performing the converting the second picture into sent-for-display data to be sent to the second display, the following step: generating, based on a screen configuration parameter of the second display, the sent-for-display data corresponding to the second picture.

9. The electronic device according to claim 7, wherein when the instructions are executed by the electronic device, the electronic device is enabled to perform, when performing the sending the sent-for-display data of the first display to the first display, the following step: sending the sent-for-display data of the first display according to a communication protocol of the first communication connection; and when the instructions are executed by the electronic device, the electronic device is enabled to perform, when performing the sending the sent-for-display data of the second display to the second display, the following step: sending the sent-for-display data of the second display according to a communication protocol of the second communication connection.

10. The electronic device according to claim 9, wherein the communication protocol of the first communication connection and the communication protocol of the second communication connection are a display serial interface (DSI) protocol in a mobile industry processor interface (MIPI) protocol.

11. The electronic device according to claim 7, wherein
when the instructions are executed by the electronic device, the electronic device is enabled to perform, when performing the obtaining a picture to be displayed on a first display, the following step: obtaining a first framed picture captured by a camera lens; and generating the first camera function page based on the first framed picture; and when the instructions are executed by the electronic device, the electronic device is enabled to perform, when performing the obtaining a picture to be displayed on a second display, the following step: obtaining a second framed picture captured by the camera lens; and generating the second camera function page based on the second framed picture.

12. The electronic device according to claim 7, wherein when the instructions are executed by the electronic device, the electronic device is enabled to perform the following: after the first display displays the first picture, the first display switches a displayed picture when receiving next sent-for-display data; and after the second display displays the second picture, the second display switches a displayed picture when receiving a next group of sent-for-display data.

13. A non-transitory computer storage medium, comprising computer instructions that, when executed by a processor of a terminal, cause the terminal to perform the following steps:

receiving a multi-screen display instruction that instructs at least two displays to separately display corresponding pictures;

obtaining a first picture to be displayed on a first display;

converting the first picture into sent-for-display data to be sent to the first display;

sending the sent-for-display data of the first display to the first display, to enable the first display to display the first picture;

after the sending the sent-for-display data of the first display to the first display, obtaining a second picture to be displayed on a second display;

converting the second picture into sent-for-display data to be sent to the second display; and sending the sent-for-display data of the second display to the second display, to enable the second display to display the second picture; wherein before sending the sent-for-display data of the first display to the first display, sending a first control signal to a switching module, wherein the first control signal is used to control the switching module to establish a first communication connection to the first display, and the first communication connection is used to transmit the sent-for-display data of the first display; and before sending the sent-for-display data of the second display to the second display, sending a second control signal to the switching module, wherein the second control signal is used to control the switching module to establish a second communication connection to the second display, and the second communication connection is used to transmit the sent-for-display data of the second display; wherein the receiving a multi-screen display instruction comprises:

receiving a first operation that is used to indicate to display a first camera function page on the first display;

displaying the first camera function page on the first display in response to the first operation;

receiving, on the first camera function page, a second operation that is used to indicate to display a second camera function page on the second display; and displaying the second camera function page on the second display in response to the second operation.

14. The computer storage medium according to claim 13, wherein the converting the first picture into sent-for-display data to be sent to the first display comprises: generating, based on a screen configuration parameter of the first display, the sent-for-display data corresponding to the first picture; and the converting the second picture into sent-for-display data to be sent to the second display comprises: generating, based on a screen configuration parameter of the second display, the sent-for-display data corresponding to the second picture.

* * * * *